UNITED STATES PATENT OFFICE.

JOHN A. DEAN, OF EASTON, MASSACHUSETTS.

IMPROVED METHOD OF EXTRACTING OIL FROM LEATHER, &c.

Specification forming part of Letters Patent No. 54,303, dated May 1, 1866.

*To all whom it may concern:*

Be it known that I, JOHN A. DEAN, of Easton, in the county of Bristol and State of Massachusetts, have invented and discovered a new and useful Composition of Matter to be used for the Preservation of Boots, Shoes, Harnesses, &c., of which the following is a full and exact description.

The composition I call "extract of leather;" and it consists of fish-oil, beef's tallow, lampblack, and soap, extracted from upper-leather by the following process, viz: I fill a kettle about two-thirds full of scraps of upper-leather and then fill up the kettle with water. This I boil from four to five hours, or until all the leather becomes mucilaginous, stirring the kettle frequently during the time it is boiling. I then set it in a cool place, and when it cools the mass of oil, &c., rises to the top and becomes hard. This is then taken off and put in another kettle and melted and stirred for some time until it is thoroughly mixed, and is then turned off into boxes and is ready for sale and for use. The manner of using it is to take a brush and apply it immediately to the boot, shoe, harness, or other leather which it is desired to soften, improve, and preserve, and then it is thoroughly rubbed into the leather with the hand, brush, or cloth.

I was led to the discovery of this composition by observing oil on the surface of the water I had used to soak vamps in, and by noticing the discoloration of such water.

I claim as my own invention and discovery—

The process of making the composition and the new combination of the materials above enumerated.

JOHN A. DEAN.

In presence of—
 H. J. FULLER,
 E. P. SPOONER.